(12) United States Patent
Lin et al.

(10) Patent No.: US 12,124,660 B1
(45) Date of Patent: Oct. 22, 2024

(54) TOUCH APPARATUS

(71) Applicant: AUO Corporation, Hsinchu (TW)

(72) Inventors: Tai-Hsuan Lin, Hsinchu (TW);
Yu-Feng Chien, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/399,700

(22) Filed: Dec. 29, 2023

(30) Foreign Application Priority Data

Dec. 26, 2023 (TW) ................................ 112150773

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05)

(58) Field of Classification Search
CPC ..... G06F 3/0445; G06F 3/0446; G06F 3/0412
See application file for complete search history.

(56) References Cited

U.S. PATENT DOCUMENTS

| 10,338,712 | B2 | 7/2019 | Bok et al. |
| 11,301,067 | B2 | 4/2022 | Chen et al. |
| 11,500,484 | B2 | 11/2022 | Bok et al. |
| 2016/0179229 | A1* | 6/2016 | Ahn ...................... G06F 3/0447 345/173 |
| 2022/0107706 | A1* | 4/2022 | Lu ........................ G06F 3/04164 |
| 2022/0256706 | A1* | 8/2022 | Xiong ................. G06F 3/04164 |
| 2023/0345793 | A1* | 10/2023 | Hu ....................... H10K 59/122 |
| 2024/0118765 | A1* | 4/2024 | Lee ......................... H10K 59/88 |
| 2024/0152226 | A1* | 5/2024 | Wang ..................... G06F 3/041 |
| 2024/0172520 | A1* | 5/2024 | Ha ......................... H10K 59/40 |

FOREIGN PATENT DOCUMENTS

| CN | 111857395 | 10/2020 |
| CN | 107230434 | 10/2021 |
| CN | 111221436 | 8/2023 |
| CN | 113778261 | 9/2023 |
| KR | 20160033302 | 3/2016 |

* cited by examiner

*Primary Examiner* — Kenneth B Lee, Jr.
(74) *Attorney, Agent, or Firm* — JCIPRNET

(57) ABSTRACT

A touch apparatus includes a first conductive layer, a second conductive layer, and a third conductive layer. The first conductive layer includes a power supply electrode and a plurality of first conductive patterns. The second conductive layer includes a common electrode and a plurality of second conductive patterns. The first conductive patterns and the second conductive patterns are electrically connected to form a plurality of first conductive elements. At least one portion of the first conductive elements is first touch electrodes. The third conductive layer includes a plurality of bonding pads and a plurality of second touch electrodes. In a top view of the touch apparatus, the first touch electrodes and the second touch electrodes are staggered.

14 Claims, 10 Drawing Sheets

TOUCH APPARATUS

CROSS-REFERENCE TO RELATED APPLICATION

This application claims the priority benefit of Taiwan application serial no. 112150773, filed on Dec. 26, 2023. The entirety of the above-mentioned patent application is hereby incorporated by reference herein and made a part of this specification.

BACKGROUND

Technical Field

The disclosure relates to an electronic apparatus; more particularly, the disclosure relates to a touch apparatus.

Description of Related Art

A light emitting diode (LED) display panel includes a driving backplate and a plurality of LED elements transposed on the driving backplate. Benefiting from the inherent characteristics of the LEDs, the LED display panel exhibits advantages including but not limited to power efficiency, high efficiency, exceptional luminosity, and rapid response time. Besides, in contrast to organic light emitting diode (OLED) display panels, the LED display panels boast additional merits, such as facile color calibration, prolonged light emitting service life, and immunity to image burn-in. Given these inherent advantages, the LED display panels stand out for the next generation of display technology. To incorporate touch functionality into the LED display panel, a touch panel is externally mounted on the LED display panel, which regrettably only contributes to an augmented overall module thickness but also elevates costs.

SUMMARY

The disclosure provides a touch apparatus with favorable performance.

An embodiment of the disclosure provides a touch apparatus that includes a pixel driving circuit structure, a first insulation layer, a first conductive layer, a second insulation layer, a second conductive layer, a third insulation layer, and a third conductive layer. The first insulation layer is disposed on the pixel driving circuit structure. The first conductive layer is disposed on the first insulation layer. The first conductive layer includes a power supply electrode and a plurality of first conductive patterns, the power supply electrode is electrically connected to the pixel driving circuit structure, the first conductive patterns are structurally separated from the power supply electrode, and each of the first conductive patterns has a first end and a second end opposite to each other. The second insulation layer is disposed on the first conductive layer and has a plurality of first contact windows and a plurality of second contact windows. The first contact windows are respectively overlapped with the first ends of the first conductive patterns, and the second contact windows are respectively overlapped with the second ends of the first conductive patterns. The second conductive layer is disposed on the second insulation layer. The second conductive layer includes a common electrode and a plurality of second conductive patterns. The common electrode is structurally separated from the second conductive patterns. Each of the second conductive patterns has a first end and a second end opposite to each other. The first end of each of the second conductive patterns is electrically connected to the second end of one of the first conductive patterns through one of the second contact windows. The second end of each of the second conductive patterns is electrically connected to the first end of a next first conductive pattern of the first conductive patterns through one of the first contact windows. The first conductive patterns and the second conductive patterns are electrically connected to form a plurality of first conductive elements, and at least one portion of the first conductive elements is a plurality of first touch electrodes. The third insulation layer is disposed on the second conductive layer. The third conductive layer is disposed on the third insulation layer. The third conductive layer includes a plurality of bonding pads and a plurality of second touch electrodes. The bonding pads and the second touch electrodes are structurally separated. One portion of the bonding pads is electrically connected to the pixel driving circuit structure. In a top view of the touch apparatus, the first touch electrodes and the second touch electrodes are staggered.

Another embodiment of the disclosure provides a touch apparatus that includes a power supply electrode, a plurality of first conductive patterns, a common electrode, and a plurality of second touch electrodes. The power supply electrode includes a plurality of first longitudinal portions extending along a longitudinal direction. The first conductive patterns are structurally separated from the power supply electrode, and each of the first conductive patterns has a first end and a second end opposite to each other. The common electrode includes a plurality of second longitudinal portions extending along the longitudinal direction. The common electrode and the second conductive patterns are structurally separated. Each of the second conductive patterns has a first end and a second end opposite to each other. The first end of each of the second conductive patterns is electrically connected to the second end of one of the first conductive patterns. The second end of each of the second conductive patterns is electrically connected to the first end of a next first conductive pattern of the first conductive patterns. The first conductive patterns and the second conductive patterns are electrically connected to form a plurality of first conductive elements. At least one portion of the first conductive elements is a plurality of first touch electrodes. In a top view of the touch apparatus, the first touch electrodes and the second touch electrodes are staggered. In the top view of the touch apparatus, one of the first longitudinal portions is disposed between two adjacent second longitudinal portions of the second longitudinal portions, and the first touch electrodes are staggered with the one of the first longitudinal portions and the two adjacent second longitudinal portions.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
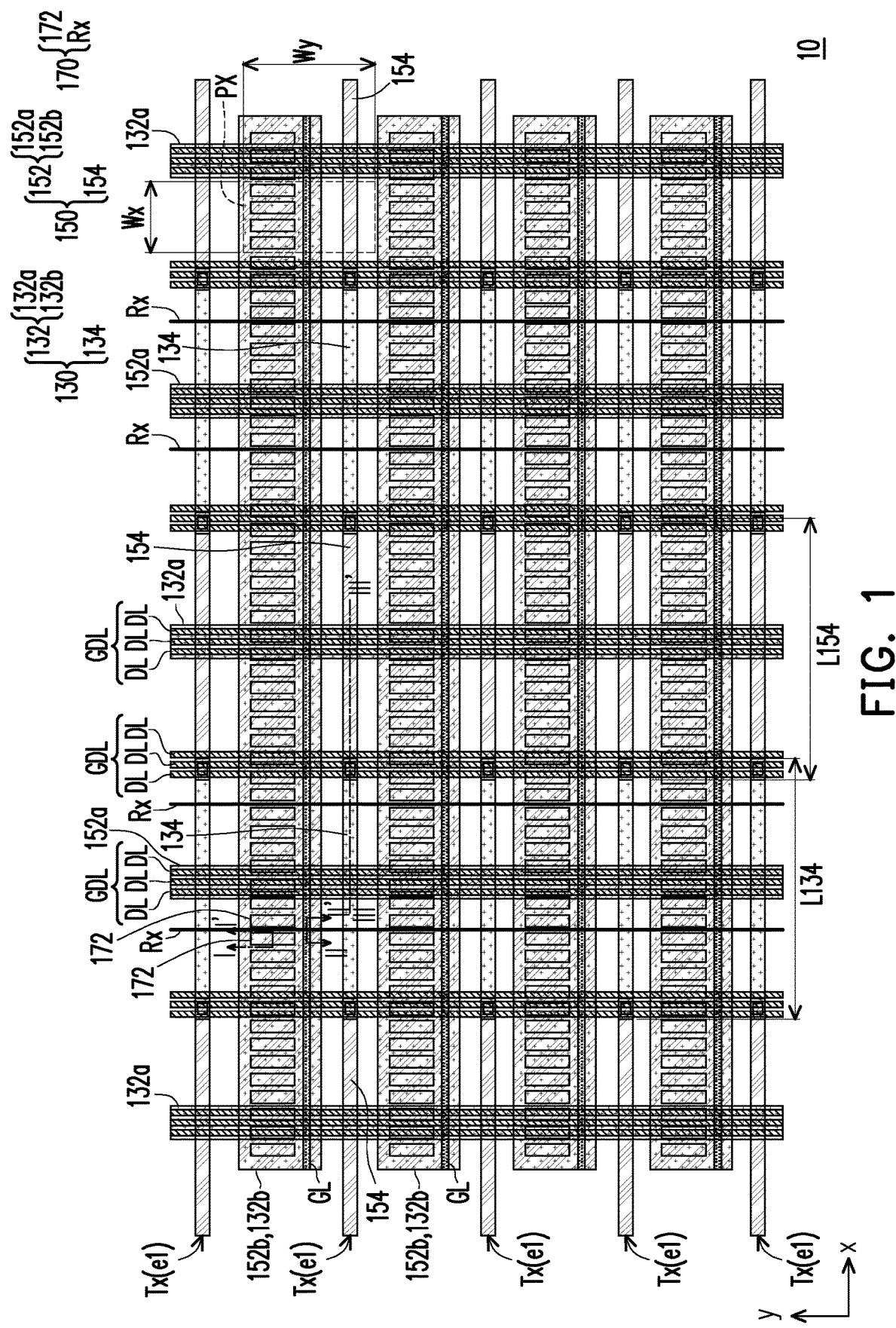
FIG. 1 is a schematic top view of a touch apparatus according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like parts.

It should be understood that when an element, such as a layer, a film, a region, or a substrate is referred to as being "on" or "connected to" another element, it can be directly on or connected to the another element, or an intermediate element may also be present. By contrast, when an element is referred to as being "directly on" or "directly connected to" another element, no intermediate element is present. As used herein, being "connected" may refer to a physical and/or electrical connection. Furthermore, being "electrically connected" or "coupled" may refer to the presence of other elements between the two elements.

Considering the particular amount of measurement and measurement-related errors discussed (i.e., the limitations of the measurement system), the terminology "about," "approximately," or "substantially" used herein includes the average of the stated value and an acceptable range of deviations from the particular value as determined by those skilled in the art. For instance, the terminology "about" may refer to as being within one or more standard deviations of the stated value, or within ±30%, ±20%, ±10%, or ±5%. Furthermore, the terminology "about," "approximately," or "substantially" as used herein may be chosen from a range of acceptable deviations or standard deviations depending on the optical properties, etching properties, or other properties, rather than one standard deviation for all properties.

Unless otherwise defined, all terminologies (including technical and scientific terminologies) used herein have the same meaning as commonly understood by people having ordinary skill in the art to which the disclosure belongs. It is understood that the terminologies, such as those defined in commonly used dictionaries, should be interpreted as having meanings consistent with the relevant art and the background or context of the disclosure, and should not be interpreted in an idealized or overly formal way, unless otherwise defined in the disclosure.

Figure 2:
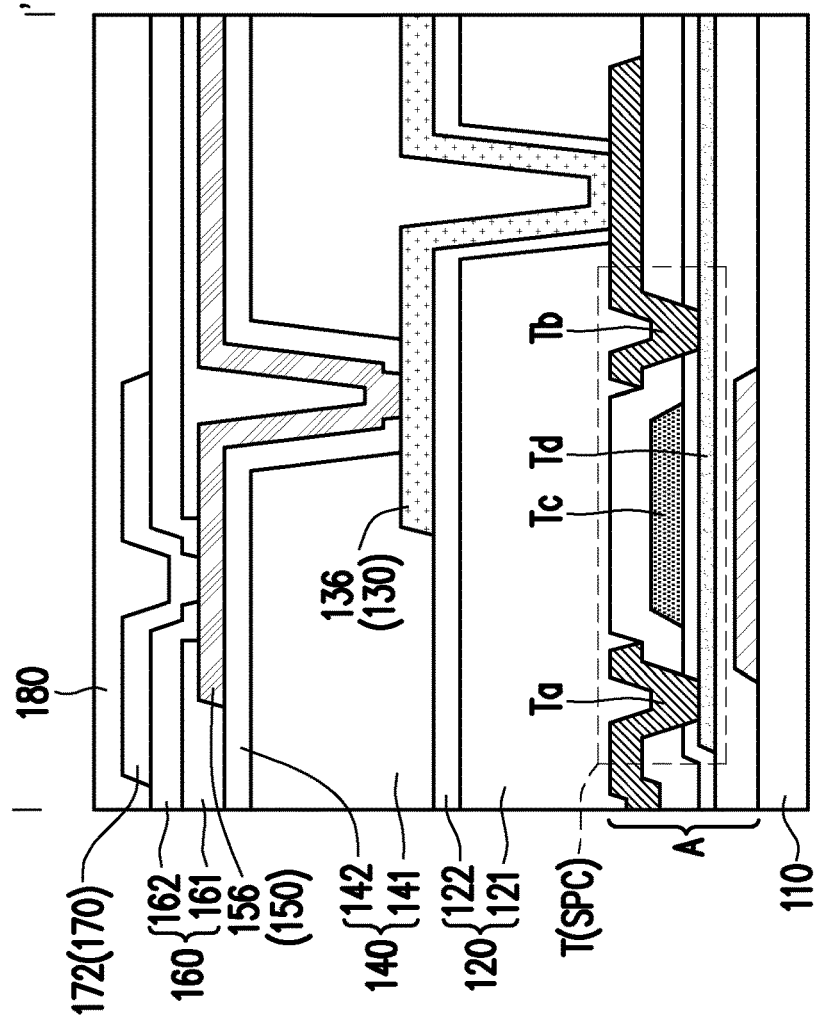
FIG. 2 is a schematic cross-sectional schematic view of a touch apparatus according to an embodiment of the disclosure.
Figure 2:
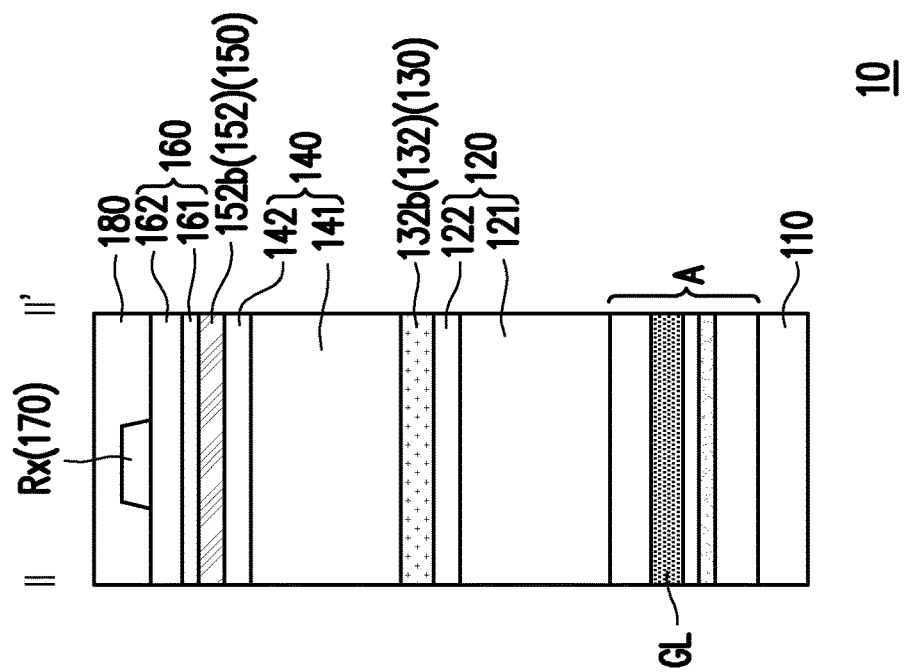
Figure 3:
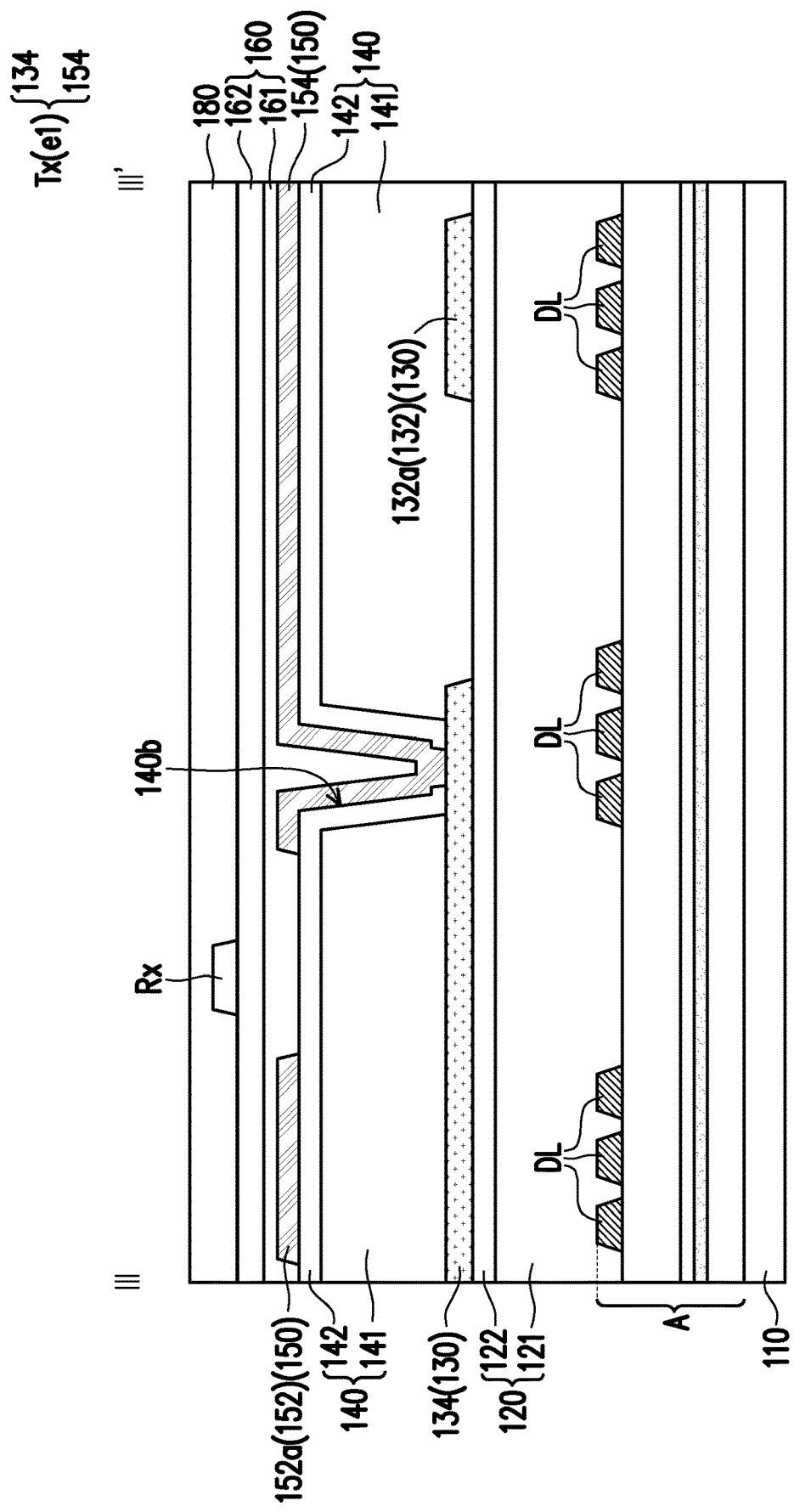
FIG. 3 is a schematic cross-sectional schematic view of a touch apparatus according to an embodiment of the disclosure.

FIG. 1 is a schematic top view of a touch apparatus according to an embodiment of the disclosure. FIG. 2 is a schematic cross-sectional schematic view of a touch apparatus according to an embodiment of the disclosure. FIG. 2 corresponds to sectional lines I-I' and II-II' depicted in FIG. 1. In FIG. 1, a substrate 110 in FIG. 2 is omitted. At the sectional line I-I' in FIG. 1, a thin film transistor T, a first connection pattern 136, and a second connection pattern 156 are omitted, and regions where a power supply electrode 132 and a common electrode 152 give way to the first connection pattern 136 and the second connection pattern 156 at the sectional line I-I' are also omitted. FIG. 3 is a schematic cross-sectional schematic view of a touch apparatus according to an embodiment of the disclosure. FIG. 3 corresponds to a sectional line III-III' depicted in FIG. 1. In FIG. 1, the substrate 110 in FIG. 3 is omitted.

With reference to FIG. 1, FIG. 2, and FIG. 3, a touch apparatus 10 includes the substrate 110 which is configured to carry other elements of the touch apparatus 10. In one embodiment, a material of the substrate 110 may include glass, quartz, an organic polymer, or any other applicable materials.

The touch apparatus 10 further includes a pixel driving circuit structure A disposed on the substrate 110. In one embodiment, the pixel driving circuit structure A may include a plurality of data lines DL, a plurality of scan lines GL that are staggered with the data lines DL, and a plurality of pixel driving circuits SPC that are electrically connected to the data lines DL and the scan lines GL, where each of the pixel driving circuits SPC includes at least one thin film transistor T, each of the thin film transistors T has a control end Tc, a semiconductor pattern Td, and a first end Ta and a second end Tb that are electrically connected to different regions of the semiconductor pattern Td.

The touch apparatus 10 further includes a first insulation layer 120 disposed on the pixel driving circuit structure A. The first insulation layer 120 may be composed of one single film layer or a plurality of film layers. For instance, in one embodiment, the first insulation layer 120 may be composed of a first planarization layer 121 and a first shielding protection layer 122 disposed on the first planarization layer 121, which should however not be construed as a limitation in the disclosure.

Figure 4:
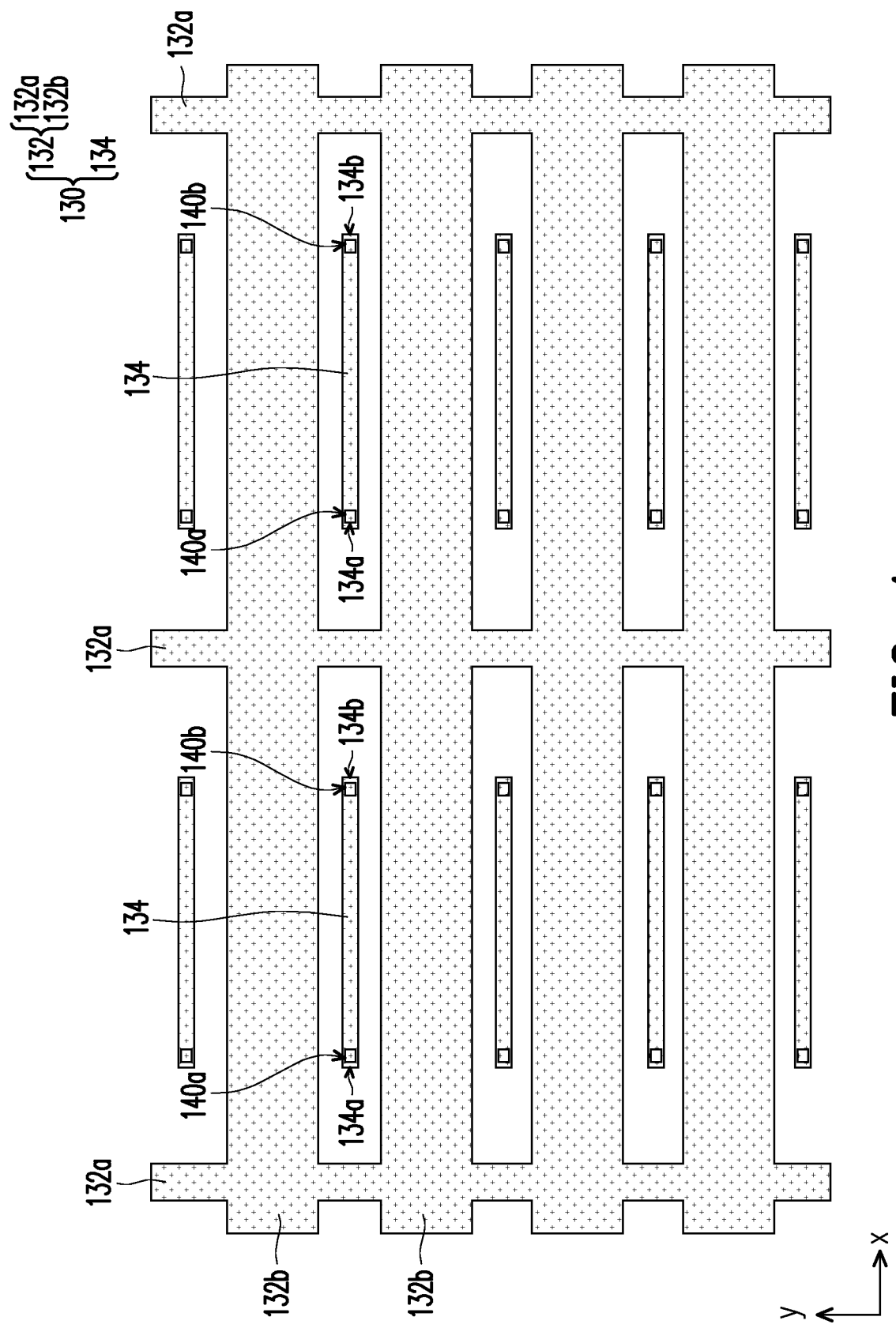
FIG. 4 is a schematic top view of a first conductive layer and a second insulation layer of a touch apparatus according to an embodiment of the disclosure.

FIG. 4 is a schematic top view of a first conductive layer and a second insulation layer of a touch apparatus according to an embodiment of the disclosure. In FIG. 4, the first connection pattern 136 of a first conductive layer 130 is omitted, and at the sectional line I-I' in FIG. 1, a region where the power supply electrode 132 gives way to the first connection pattern 136 is also omitted. With reference to FIG. 1, FIG. 2, FIG. 3, and FIG. 4, the touch apparatus 10 further includes the first conductive layer 130 disposed on the first insulation layer 120. The first conductive layer 130 includes the power supply electrode 132 and a plurality of first conductive patterns 134. The power supply electrode 134 is electrically connected to the pixel driving circuit structure A. The first conductive patterns 134 are structurally separated from the power supply electrode 132. Each first conductive pattern 134 has a first end 134a and a second end 134b opposite to each other.

With reference to FIG. 1 and FIG. 4, In one embodiment, the power supply electrode 132 includes a plurality of first longitudinal portions 132a extending along a longitudinal direction y and a plurality of first transverse portions 132b extending along a transverse direction x, where the first transverse portions 132b are staggered with the first longitudinal portions 132a. With reference to FIG. 1, FIG. 2, FIG. 3, and FIG. 4, In one embodiment, a portion of the data lines DL of the touch apparatus 10 may be disposed under the first longitudinal portions 132a of the power supply electrode 132, and the scan lines GL of the touch apparatus 10 may be disposed under the first transverse portions 132b of the power supply electrode 132. With reference to FIG. 1 and FIG. 4, In one embodiment, each first conductive pattern 134 may be disposed between two adjacent first longitudinal portions 132a of the power supply electrode 132 and between two adjacent first transverse portions 132b of the power supply electrode 132.

With reference to FIG. 1, FIG. 2, and FIG. 3, the touch apparatus 10 further includes a second insulation layer 140 disposed on the first conductive layer 130. The second insulation layer 140 may be composed of one single film layer or a plurality of film layers. For instance, in one embodiment, the second insulation layer 140 may be composed of a second planarization layer 141 and a second shielding protective layer 142 disposed on the second planarization layer 141, which should however not be construed as a limitation in the disclosure. With reference to FIG. 1 and FIG. 4, the second insulation layer 140 has a plurality of first contact windows 140a and a plurality of second contact windows 140b, where the first contact windows 140a are respectively overlapped with the first ends 134a of the first conductive patterns 134, and the second contact windows 140b are respectively overlapped with the second ends 134b of the first conductive patterns 134.

Figure 5:
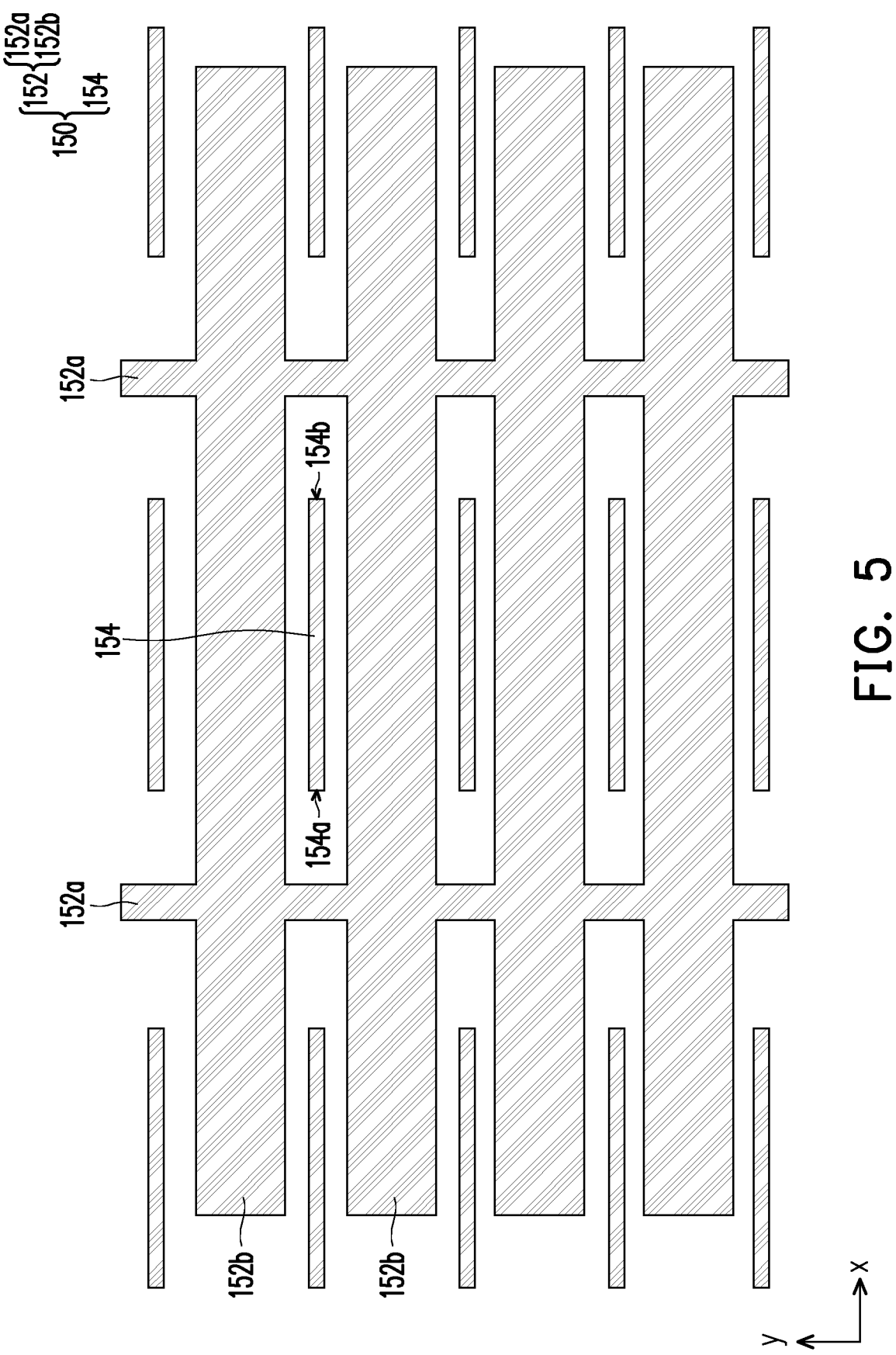
FIG. 5 is a schematic top view of a second conductive layer of a touch apparatus according to an embodiment of the disclosure.

FIG. 5 is a schematic top view of a second conductive layer of a touch apparatus according to an embodiment of the disclosure. In FIG. 5, a second connection pattern 156 of a second conductive layer 150 is omitted, and at the sectional line I-I' in FIG. 1, a region where the common electrode 152 gives way to the second connection pattern 156 is also omitted.

With reference to FIG. 1, FIG. 2, FIG. 3, and FIG. 5, the touch apparatus 10 further includes the second conductive layer 150, disposed on the second insulation layer 140. The second conductive layer 150 includes the common electrode 152. In one embodiment, the common electrode 152 includes a plurality of second longitudinal portions 152a extending along the longitudinal direction y and a plurality of second transverse portions 152b extending along the transverse direction x, where the second transverse portions 152b are staggered with the second longitudinal portions 152a.

Figure 6:
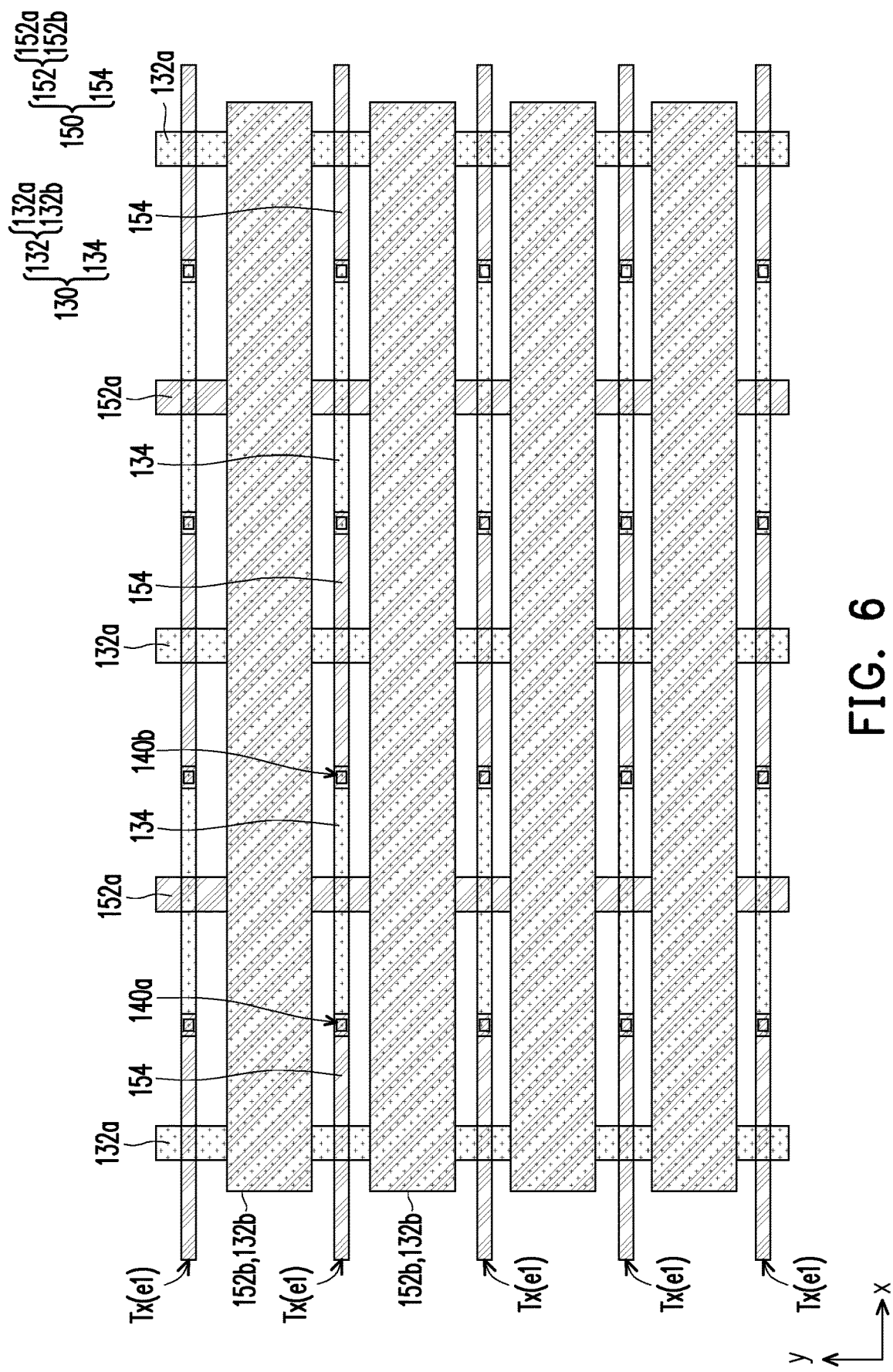
FIG. 6 is a schematic top view of a first conductive layer, a second insulation layer, and a second conductive layer of a touch apparatus according to an embodiment of the disclosure.

FIG. 6 is a schematic top view of a first conductive layer, a second insulation layer, and a second conductive layer of a touch apparatus according to an embodiment of the disclosure. In FIG. 6, the first connection pattern 136 of the first conductive layer 130 is omitted, and at the sectional line I-I' in FIG. 1, a region where the power supply electrode 132 gives way to the first connection pattern 136 is also omitted. Besides, in FIG. 6, the second connection pattern 156 of the second conductive layer 150 is omitted, and at the sectional line I-I' in FIG. 1, a region where the common electrode 152 gives way to the second connection pattern 156 is also omitted.

With reference to FIG. 1, FIG. 4, FIG. 5, and FIG. 6, In one embodiment, in the top view of the touch apparatus 10, the second transverse portions 152b of the common electrode 152 are overlapped with the first transverse portions 132b of the power supply electrode 132. In one embodiment, in the top view of the touch apparatus 10, one of the first longitudinal portions 132a of the power supply electrode 132 is disposed between two adjacent second longitudinal portions 152a of the common electrode 152. In one embodiment, in the top view of the touch apparatus 10, the first longitudinal portions 132a of the power supply electrode 132 and the second longitudinal portions 152a of the common electrode 152 are alternately arranged in the transverse direction x.

With reference to FIG. 1, FIG. 2, FIG. 3, FIG. 5, and FIG. 6, the second conductive layer 150 further includes a plurality of second conductive patterns 154. The common electrode 152 and the second conductive patterns 154 are structurally separated. In one embodiment, each second conductive pattern 154 may be disposed between two adjacent second longitudinal portions 152a of the common electrode 152 and between two adjacent second transverse portions 152b of the common electrode 152.

Each second conductive pattern 154 has a first end 154a and a second end 154b opposite to each other. The first end 154a of each second conductive pattern 154 is electrically connected to the second end 134b of one of the first conductive patterns 134 through one of the second contact windows 140b of the second insulation layer 140. The second end 154b of each second conductive pattern 154 is electrically connected to the first end 134a of the next first conductive pattern of the first conductive patterns 134 through one of the first contact windows 140a of the second insulation layer 140. Thereby, the first conductive patterns 134 and the second conductive patterns 154 may be electrically connected to form a plurality of first conductive elements e1, and at least one portion of the first conductive elements e1 is a plurality of first touch electrodes Tx.

With reference to FIG. 1, FIG. 4, FIG. 5, and FIG. 6, In one embodiment, the first conductive elements e1 are staggered with one of the first longitudinal portions 132a of the power supply electrode 132 and two adjacent second longitudinal portions 152a of the common electrode 152. In one embodiment, in the top view of the touch apparatus 10, each first conductive element e1 is located between two adjacent first transverse portions 132b of the power supply electrode 132 and two adjacent second transverse portions 152b of the common electrode 152. In one embodiment, the first conductive patterns 134 of the first conductive element e1 are staggered with the second longitudinal portions 152a of the common electrode 152. In one embodiment, the second conductive patterns 154 of the first conductive element e1 are staggered with the first longitudinal portions 132a of the power supply electrode 132.

With reference to FIG. 1, In one embodiment, two adjacent data line groups GDL and two adjacent second transverse portions 152b of the common electrode 152 define one pixel region PX. The pixel region PX has a width Wy in the longitudinal direction y and a width Wx in the transverse direction x. Two adjacent first conductive patterns 134 of the first touch electrode Tx are spaced from each other by at least two widths Wx of the pixel region PX. Two adjacent first touch electrodes Tx are located in upper and lower pixel regions PX or are spaced from each other by at least one width Wy of the pixel region PX. A length L134 of each first conductive pattern 134 is at least one width Wx. A length L154 of each second conductive pattern 154 is at least one width Wx.

With reference to FIG. 1, FIG. 2, and FIG. 3, the touch apparatus 10 further includes a third insulation layer 160 disposed on the second conductive layer 150. The third insulation layer 160 may be composed of one single film layer or a plurality of film layers. For instance, in one embodiment, the third insulation layer 160 may be composed of a third shielding protection layer 161 and a fourth shielding protection layer 162 disposed on the third shielding protection layer 161, which should however not be construed as a limitation in the disclosure.

Figure 7:
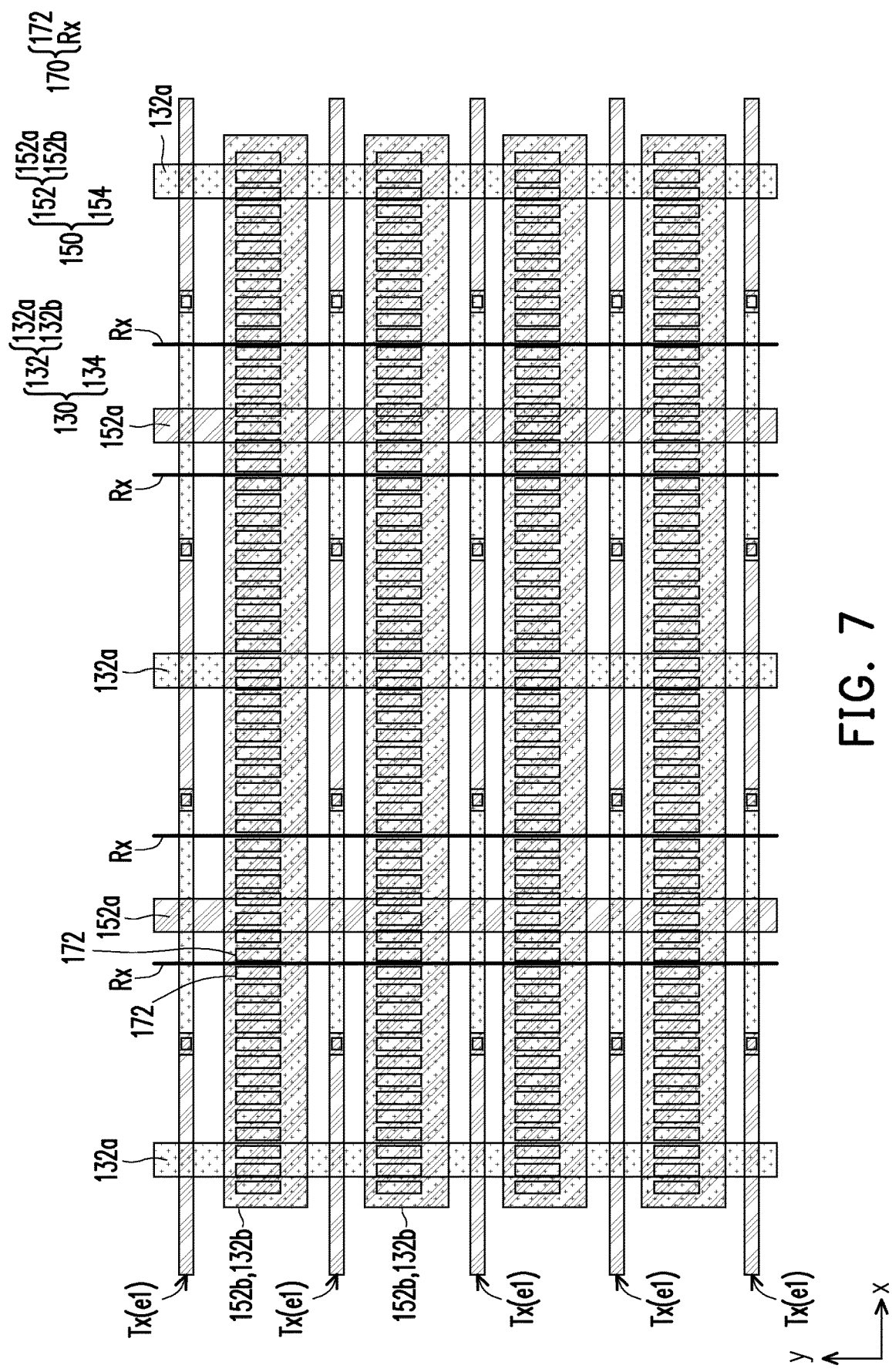
FIG. 7 is a schematic top view of a first conductive layer, a second insulation layer, a second conductive layer, and a third conductive layer of a touch apparatus according to an embodiment of the disclosure.

FIG. 7 is a schematic top view of a first conductive layer, a second insulation layer, a second conductive layer, and a third conductive layer of a touch apparatus according to an embodiment of the disclosure. In FIG. 7, the first connection pattern 136 of the first conductive layer 130 is omitted, and at the sectional line I-I' in FIG. 1, a region where the power supply electrode 132 gives way to the first connection pattern 136 is also omitted. Besides, in FIG. 7, the second connection pattern 156 of the second conductive layer 150 is omitted, and at the sectional line I-I' in FIG. 1, a region where the common electrode 152 gives way to the second connection pattern 156 is also omitted.

With reference to FIG. 1, FIG. 2, FIG. 3, and FIG. 7, the touch apparatus 10 further includes a third conductive layer 170 disposed on the third insulation layer 160. The third conductive layer 170 includes a plurality of bonding pads 172. The bonding pads 172 are configured to be bonded to a plurality of light emitting elements (e.g., micro LEDs that are not shown in the drawings), thereby enabling the touch apparatus 10 to have both touch and display functions. One portion of the bonding pads 172 is electrically connected to the common electrode 152, and the other portion of the bonding pads 172 is electrically connected to the pixel driving circuit structure A. Specifically, In one embodiment, the first conductive layer 130 further includes one first connection pattern 136 (shown in FIG. 1), and the first connection pattern 136, the power supply electrode 132, and the first conductive patterns 134 are structurally separated; the second conductive layer 150 further includes one second connection pattern 156 (shown in FIG. 1), and the second connection pattern 156, the common electrode 152, and the second conductive patterns 154 are structurally separated. One of the bonding pads 172 may be electrically connected to the second end Tb of the thin film transistor T of the pixel driving circuit structure A through the second connection pattern 156 and the first connection pattern 136.

The third conductive layer 170 further includes a plurality of second touch electrodes Rx. The bonding pads 172 are structurally separated from the second touch electrodes Rx. In the top view of the touch apparatus 10, the first touch electrodes Tx are staggered with the second touch electrodes Rx. In one embodiment, the first touch electrodes Tx are, for instance, driving electrodes, and the second touch electrodes Rx are, for instance, sensing electrodes, which should however not be construed as a limitation in the disclosure. In other embodiments, the first touch electrodes Tx may also be the sensing electrodes, and the second touch electrodes Rx may be the driving electrodes. In one embodiment, a material of the third conductive layer 170 includes, for instance, copper, which should however not be construed as a limitation in the disclosure. In one embodiment, the touch apparatus 10 may optionally include a fifth shielding protection layer 180 disposed on the third conductive layer 170.

In one embodiment, in the top view of the touch apparatus 10, the second touch electrodes Rx may be disposed between two adjacent bonding pads 172. In one embodiment, in the top view of the touch apparatus 10, the second touch electrodes Rx are staggered with the first conductive patterns 134 of the first touch electrodes Tx and also staggered with the second conductive patterns 154 of the first touch electrodes Tx. That is, in consideration of capacitive design, the second touch electrodes Rx are staggered with the first touch electrodes Tx above the first conductive patterns 134 that are relatively farther away from the second touch electrodes Rx.

In one embodiment, note that the first touch electrodes Tx and the second touch electrodes Rx may be added by using the existing conductive layers inherently disposed on the driving backplate bonded to the light emitting element (not shown) rather than adding other film layers to manufacture the first touch electrodes Tx and the second touch electrodes Rx. Without adding any film layer, the driving backplate may encompass touch sensing functions, and a built-in touch display apparatus may be formed after the driving backplate having the touch sensing functions is bonded to the light emitting element.

It should be noted that reference numbers of the devices and a part of contents of the previous embodiments are also used in the following embodiments, where the same reference numbers denote the same or like devices, and descriptions of the same technical contents are omitted. The previous embodiments may be referred for descriptions of the omitted parts, and detailed descriptions thereof are not repeated in the following embodiments.

Figure 8:
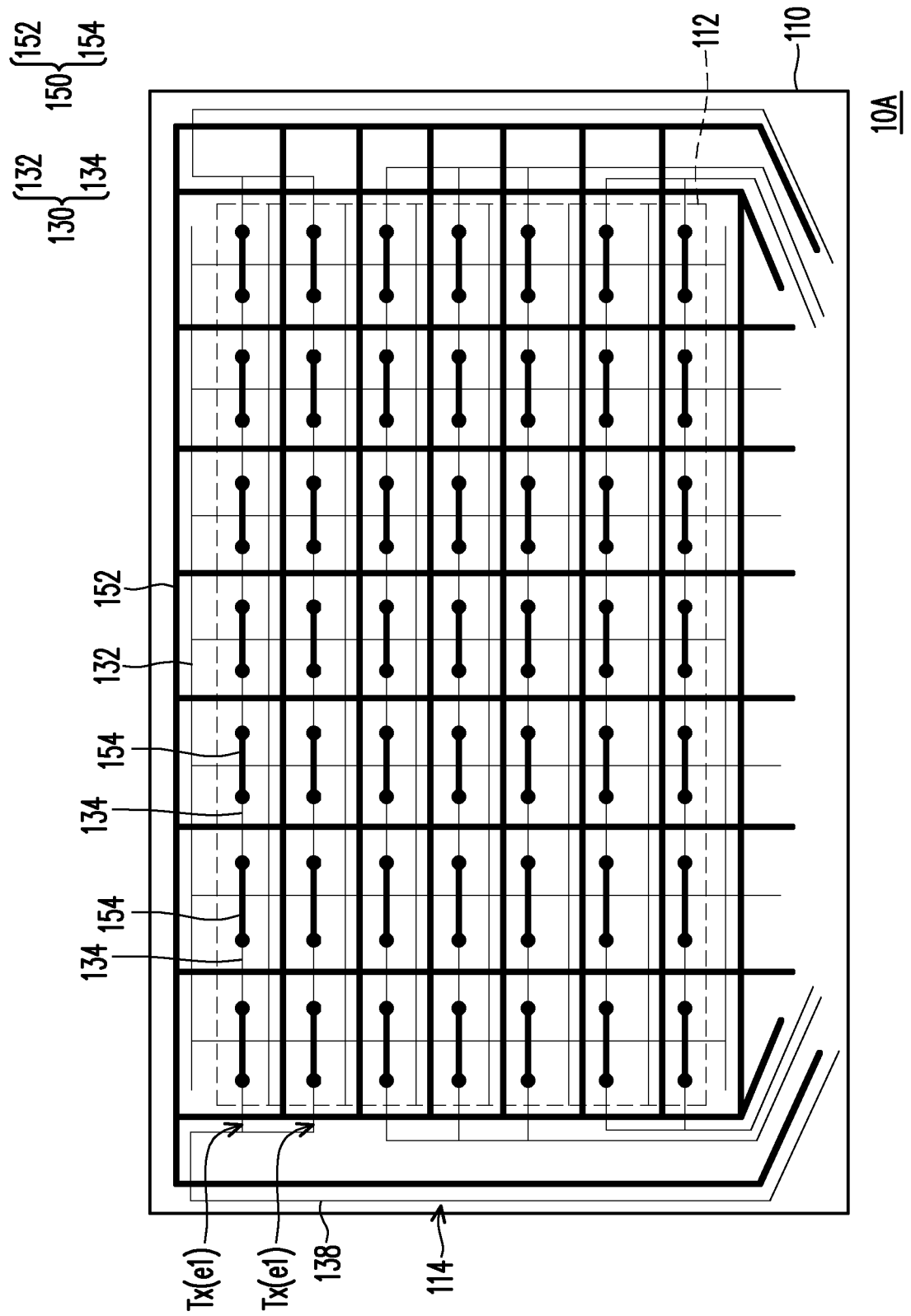
FIG. 8 is a schematic top view of a touch apparatus according to another embodiment of the disclosure.

FIG. 8 is a schematic top view of a touch apparatus according to another embodiment of the disclosure. FIG. 8 depicts the substrate 110, the first touch electrodes Tx, the power supply electrode 132, the common electrode 152, and peripheral wirings 138 of a touch apparatus 10A, while other components of the touch apparatus 10A are omitted. With reference to FIG. 8, in one embodiment, the substrate 110 has an active region 112 and a peripheral region 114 outside the active region 112, the first conductive patterns 134 of the first touch electrodes Tx are disposed in the active region 112, and the touch display apparatus 10A further includes the peripheral wirings 138 disposed in the peripheral region 114, each of which may be optionally electrically connected to the first touch electrodes Tx.

Figure 9:
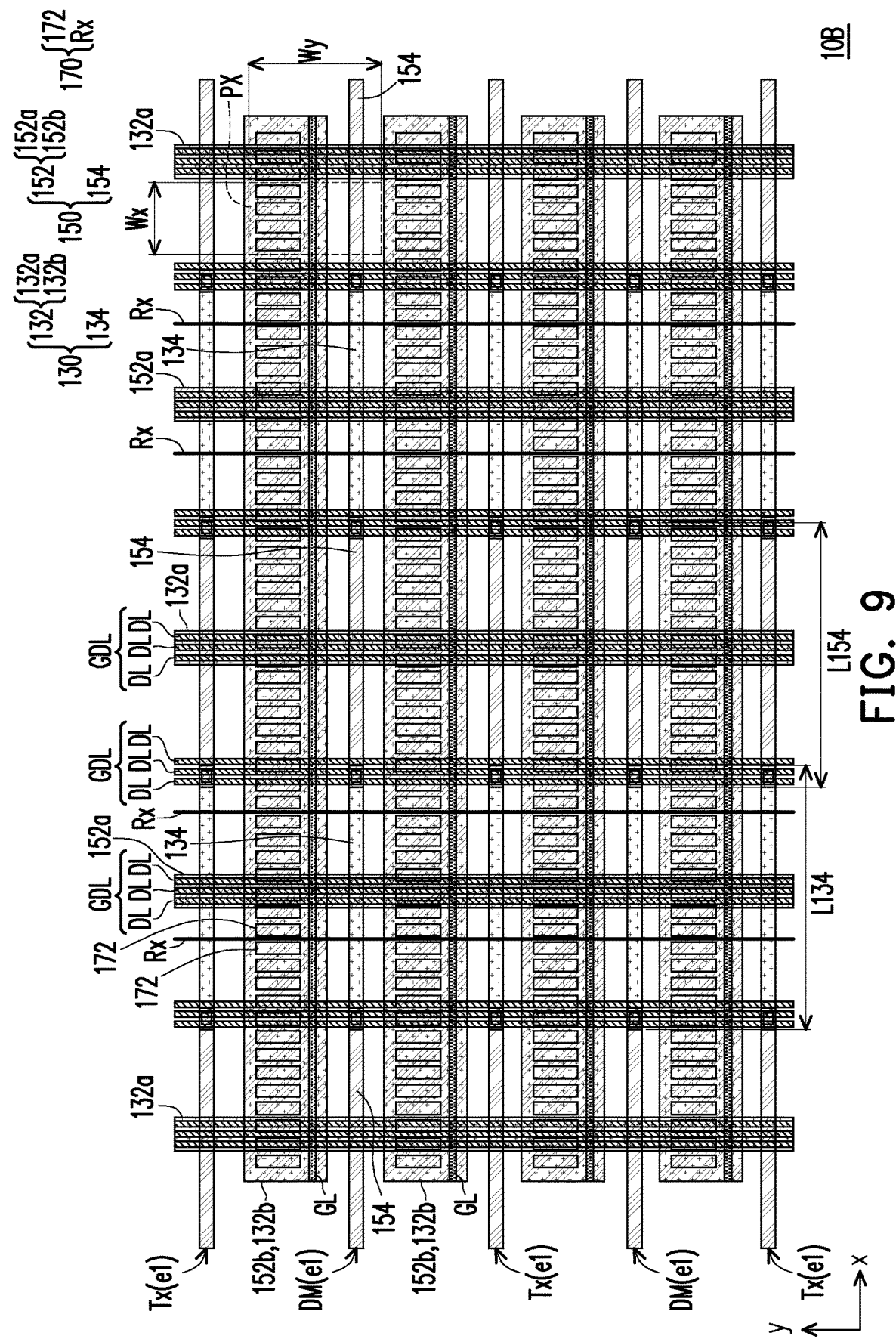
FIG. 9 is a schematic top view of a touch apparatus according to yet another embodiment of the disclosure.

FIG. 9 is a schematic top view of a touch apparatus according to yet another embodiment of the disclosure. A touch apparatus 10B in FIG. 9 is similar to the touch apparatus 10 in FIG. 1. In the embodiments respectively depicted in FIG. 1 and FIG. 9, each pixel region PX in each row is provided with one of the first conductive elements e1. The difference between the embodiments depicted in FIG. 1 and FIG. 9 lies in that each first conductive element e1 provided in the embodiment depicted in FIG. 1 serves as the first touch electrode Tx; by contrast, in the embodiment depicted in FIG. 9, some first conductive elements e1 serve as the first touch electrodes Tx, while the other first conductive elements e1 serve as floating dummy electrodes DM.

Figure 10:
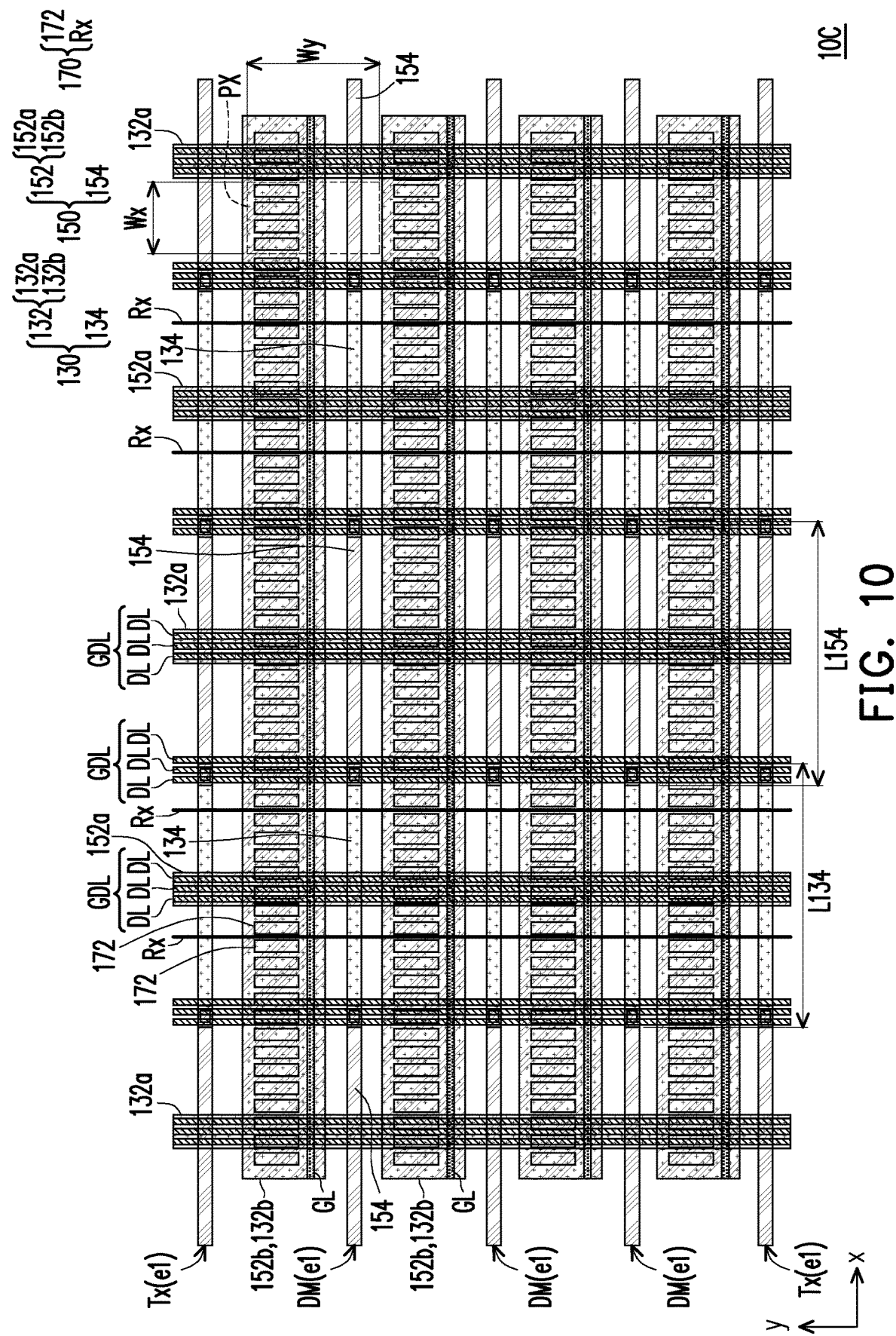
FIG. 10 is a schematic top view of a touch apparatus according to still another embodiment of the disclosure.

FIG. 10 is a schematic top view of a touch apparatus according to still another embodiment of the disclosure. A touch apparatus 10C depicted in FIG. 10 is similar to the touch apparatus 10B depicted in FIG. 9. In the embodiments respectively depicted in FIG. 9 and FIG. 10, some first conductive elements e1 serve as the first touch electrodes Tx, while the other first conductive elements e1 serve as the floating dummy electrodes DM, and at least one dummy electrode DM is disposed between two adjacent first touch electrodes Tx. The difference between the embodiments depicted in FIG. 9 and FIG. 10 lies in that the number of the dummy electrodes DM between two adjacent first touch electrodes Tx in the two embodiments is different. In the embodiment depicted in FIG. 9, there is one dummy electrode DM between two adjacent first touch electrodes Tx. In the embodiment depicted in FIG. 10, there are N dummy electrodes DM between two adjacent first touch electrodes Tx, where N may be a positive integer greater than or equal to 2.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch apparatus, comprising:
    a pixel driving circuit structure;
    a first insulation layer, disposed on the pixel driving circuit structure;
    a first conductive layer, disposed on the first insulation layer, wherein the first conductive layer comprises a power supply electrode and a plurality of first conductive patterns, the power supply electrode is electrically connected to the pixel driving circuit structure, the first conductive patterns are structurally separated from the power supply electrode, and each of the first conductive patterns has a first end and a second end opposite to each other;
    a second insulation layer, disposed on the first conductive layer and having a plurality of first contact windows and a plurality of second contact windows, wherein the first contact windows are respectively overlapped with the first ends of the first conductive patterns, and the second contact windows are respectively overlapped with the second ends of the first conductive patterns;
    a second conductive layer, disposed on the second insulation layer, wherein the second conductive layer comprises a common electrode and a plurality of second conductive patterns, the common electrode is structurally separated from the second conductive patterns, each of the second conductive patterns has a first end and a second end opposite to each other, the first end of each of the second conductive patterns is electrically connected to the second end of one of the first conductive patterns through one of the second contact windows, the second end of each of the second conductive patterns is electrically connected to the first end of a next first conductive pattern of the first conductive patterns through one of the first contact windows, the first conductive patterns and the second conductive patterns are electrically connected to form a plurality of first conductive elements, and at least one portion of the first conductive elements is a plurality of first touch electrodes;
    a third insulation layer, disposed on the second conductive layer; and
    a third conductive layer, disposed on the third insulation layer, wherein the third conductive layer comprises a plurality of bonding pads and a plurality of second touch electrodes, the bonding pads and the second touch electrodes are structurally separated, one portion of the bonding pads is electrically connected to the pixel driving circuit structure, and in a top view of the touch apparatus, the first touch electrodes and the second touch electrodes are staggered.

2. The touch apparatus according to claim 1, wherein in the top view of the touch apparatus, one of the second touch electrodes is disposed between two adjacent bonding pads of the bonding pads.

3. The touch apparatus according to claim 1, wherein in the top view of the touch apparatus, one of the second touch electrodes and one of the first conductive patterns of one of the first touch electrodes are staggered, and the one of the second touch electrodes and the second conductive patterns of the first touch electrodes are alternately arranged.

4. The touch apparatus according to claim 1, wherein the power supply electrode comprises a plurality of first longitudinal portions extending along a longitudinal direction, the common electrode comprises a plurality of second longitudinal portions extending along the longitudinal direction; in the top view of the touch apparatus, one of the first longitudinal portions is disposed between two adjacent second longitudinal portions of the second longitudinal portions, and the first touch electrodes are staggered with the one of the first longitudinal portions and the two adjacent second longitudinal portions.

5. The touch apparatus according to claim 4, wherein the power supply electrode further comprises a plurality of first transverse portions extending along a transverse direction, the first transverse portions are staggered with the first longitudinal portions; in the top view of the touch apparatus, one of the first touch electrodes is located between two adjacent first transverse portions of the first transverse portions of the power supply electrode.

6. The touch apparatus according to claim 5, wherein the common electrode comprises a plurality of second transverse portions extending along the transverse direction, the second transverse portions are staggered with the second longitudinal portions; in the top view of the touch apparatus, the one of the first touch electrodes is further located between the second transverse portions of the common electrode.

7. The touch apparatus according to claim 4, wherein one of the first conductive patterns of one of the first touch electrodes is staggered with one of the second longitudinal portions of the common electrode.

8. The touch apparatus according to claim 7, wherein one of the second conductive patterns of the one of the first touch electrodes is staggered with one of the first longitudinal portions of the power supply electrode.

9. The touch apparatus according to claim 1, wherein the first conductive elements further comprise a plurality of dummy electrodes, the dummy electrodes are floating; in the top view of the touch apparatus, at least one dummy electrode is disposed between two adjacent first touch electrodes of the first touch electrodes.

10. A touch apparatus, comprising:
    a power supply electrode, comprising a plurality of first longitudinal portions extending along a longitudinal direction;
    a plurality of first conductive patterns, wherein the first conductive patterns are structurally separated from the power supply electrode, and each of the first conductive patterns has a first end and a second end opposite to each other;
    a common electrode, comprising a plurality of second longitudinal portions extending along the longitudinal direction;
    a plurality of second conductive patterns, wherein the common electrode and the second conductive patterns are structurally separated, each of the second conductive patterns has a first end and a second end opposite to each other, the first end of each of the second conductive patterns is electrically connected to the second end of one of the first conductive patterns, the second end of each of the second conductive patterns is electrically connected to the first end of a next first conductive pattern of the first conductive patterns, the first conductive patterns and the second conductive patterns are electrically connected to form a plurality of first conductive elements, and at least one portion of the first conductive elements is a plurality of first touch electrodes; and a plurality of second touch electrodes, wherein in a top view of the touch apparatus, the first touch electrodes and the second touch electrodes are staggered;

in the top view of the touch apparatus, one of the first longitudinal portions is disposed between two adjacent second longitudinal portions of the second longitudinal portions, and the first touch electrodes are staggered with the one of the first longitudinal portions and the two adjacent second longitudinal portions.

11. The touch apparatus according to claim 10, wherein the power supply electrode further comprises a plurality of first transverse portions extending along a transverse direction, the first transverse portions are staggered with the first longitudinal portions; in the top view of the touch apparatus, one of the first touch electrodes is located between two adjacent first transverse portions of the first transverse portions of the power supply electrode.

12. The touch apparatus according to claim 11, wherein the common electrode comprises a plurality of second transverse portions extending along the transverse direction, the second transverse portions are staggered with the second longitudinal portions; in the top view of the touch apparatus, the one of the first touch electrodes is further located between the second transverse portions of the common electrode.

13. The touch apparatus according to claim 10, wherein one of the first conductive patterns of one of the first touch electrodes is staggered with one of the second longitudinal portions of the common electrode.

14. The touch apparatus according to claim 13, wherein one of the second conductive patterns of the one of the first touch electrodes is staggered with one of the first longitudinal portions of the power supply electrode.

* * * * *